(12) United States Patent
Marchal et al.

(10) Patent No.: US 12,379,332 B2
(45) Date of Patent: Aug. 5, 2025

(54) BLADE

(71) Applicant: SAFRAN AIRCRAFT ENGINES, Paris (FR)

(72) Inventors: Yann Didier Simon Marchal, Moissy Cramayel (FR); Antonin Branteghem, Moissy Cramayel (FR); Julien Paul Schneider-Die-Gross, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 393 days.

(21) Appl. No.: 17/923,100

(22) PCT Filed: May 4, 2021

(86) PCT No.: PCT/FR2021/050766
§ 371 (c)(1),
(2) Date: Nov. 3, 2022

(87) PCT Pub. No.: WO2021/224573
PCT Pub. Date: Nov. 11, 2021

(65) Prior Publication Data
US 2023/0175986 A1 Jun. 8, 2023

(30) Foreign Application Priority Data

May 4, 2020 (FR) ..................................... 2004386

(51) Int. Cl.
*G01N 23/044* (2018.01)
*B29C 70/48* (2006.01)
(Continued)

(52) U.S. Cl.
CPC ......... *G01N 23/044* (2018.02); *B29C 70/541* (2013.01); *G01N 23/083* (2013.01);
(Continued)

(58) Field of Classification Search
CPC ............... G01N 23/044; G01N 23/083; G01N 2223/04; G01N 2223/63; G01N 2223/419
See application file for complete search history.

(56) References Cited

U.S. PATENT DOCUMENTS 5,841,892 A * 11/1998 McGrath ................... G06T 7/73
                                                                382/173
6,290,895 B1 * 9/2001 Wang ................. B29D 99/0025
                                                                425/389
(Continued)

FOREIGN PATENT DOCUMENTS

CN   110914637 A   3/2020
FR   3 034 339 A1  10/2016
FR   3 042 869 A1  4/2017

OTHER PUBLICATIONS

Emerson et al., "Individual fibre segmentation from 3D X-ray computed tomography for characterising the fibre orientation in unidirectional composite materials", Composites, Part A, Applied Science and Manufacturing, vol. 97, 2017, pp. 83-92 (10 pages total).

(Continued)

*Primary Examiner* — Blake C Riddick
(74) *Attorney, Agent, or Firm* — Sughrue Mion, PLLC

(57) ABSTRACT

The invention relates to a method for verifying the positioning of a fibrous preform in a blade, the blade having been obtained by injecting a resin into a mould having the shape of a blade and in which a preform has been placed, the blade extending in an orthonormal blade frame of reference X, Y, Z, the blade comprising a blade root extending longitudinally along an axis X, a vane extending from the blade root along an axis Z, the blade having a thickness defined along an axis Y, the preform comprising glass tracers positioned at the surface of the preform, the centre of the tracers defining a neutral axis located at a height along the axis Z in the (Continued)

direction defined by the axis X, the method comprising the following steps: the acquisition (E31) of tomographic 2D projections of the blade using an imaging system comprising an X-ray source, each projection being acquired at a given orientation of the X-ray source with respect to the blade; the combining (E32, E32a, E32b) of the 2D projections in the direction of the axis Y so as to obtain a cumulative 2D image in the directions X and Z; the determining (E33), for each pixel column defined in the direction of the axis Z, of a greyscale profile; the processing (E34) of each of the profiles obtained so as to locate the position, in Z, of the neutral axis in the direction of the axis X.

8 Claims, 6 Drawing Sheets

(51) Int. Cl.
　　　B29C 70/54　　　　(2006.01)
　　　B29L 31/08　　　　(2006.01)
　　　G01N 23/083　　　(2018.01)
(52) U.S. Cl.
　　　CPC ......... *B29C 70/48* (2013.01); *B29L 2031/082* (2013.01); *G01N 2223/04* (2013.01); *G01N 2223/419* (2013.01); *G01N 2223/63* (2013.01)

(56) References Cited

U.S. PATENT DOCUMENTS

| | | | |
|---|---|---|---|
| 11,054,373 B2 | 7/2021 | Jespersen et al. | |
| 2006/0039792 A1* | 2/2006 | Ferte | F01D 5/147 416/232 |
| 2007/0092379 A1* | 4/2007 | Coupe | F04D 29/324 264/103 |
| 2008/0099958 A1* | 5/2008 | Romero | B29C 70/865 264/328.1 |
| 2008/0099965 A1* | 5/2008 | Romero | B29C 70/543 264/640 |
| 2011/0176927 A1* | 7/2011 | Alexander | F01D 5/286 29/889.71 |
| 2012/0051935 A1* | 3/2012 | Naik | D03D 25/005 416/230 |
| 2012/0087801 A1* | 4/2012 | Driver | B29C 70/34 156/182 |
| 2012/0267039 A1* | 10/2012 | Dambrine | F01D 5/282 425/506 |
| 2012/0297943 A1* | 11/2012 | Grosbois | B29C 70/545 83/15 |
| 2013/0101429 A1* | 4/2013 | Roussille | F01D 5/147 264/103 |
| 2013/0108422 A1* | 5/2013 | Coupe | F01D 9/02 416/223 R |
| 2013/0243604 A1* | 9/2013 | Roussille | F01D 5/282 29/889.22 |
| 2014/0030076 A1* | 1/2014 | Nunez | C04B 35/571 29/889.7 |
| 2015/0165571 A1* | 6/2015 | Marchal | F01D 5/282 83/72 |
| 2015/0239181 A1* | 8/2015 | Corradini | B65H 23/0328 156/64 |
| 2015/0239183 A1* | 8/2015 | Schneider | B29C 70/62 264/437 |
| 2015/0302577 A1* | 10/2015 | Marolle | G06T 7/001 382/152 |
| 2016/0077019 A1* | 3/2016 | Mathon | D03J 1/007 356/238.1 |
| 2016/0243777 A1* | 8/2016 | Marchal | B29C 43/006 |
| 2016/0288380 A1* | 10/2016 | Marchal | B29C 70/48 |
| 2016/0297171 A1* | 10/2016 | Bolsee | B29B 11/16 |
| 2017/0198591 A1* | 7/2017 | Roussille | C04B 35/565 |
| 2017/0312998 A1* | 11/2017 | Techer | D03D 1/00 |
| 2018/0051705 A1* | 2/2018 | Foster | B29B 11/16 |
| 2020/0158664 A1* | 5/2020 | Jespersen | G01B 11/24 |

OTHER PUBLICATIONS

Search Report and Written Opinion dated Feb. 17, 2021 from the French Intellectual Property Office in FR Application No. 2004386.
International Search Report dated Sep. 1, 2021 from the International Searching Authority in International Application No. PCT/FR2021/050766.
Written Opinion dated Sep. 1, 2021 from the International Searching Authority in International Application No. PCT/FR2021/050766.

* cited by examiner

PRIOR ART

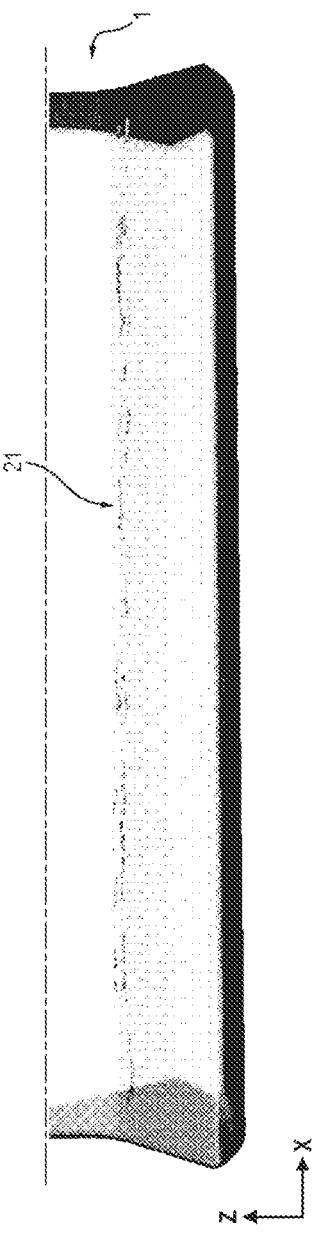
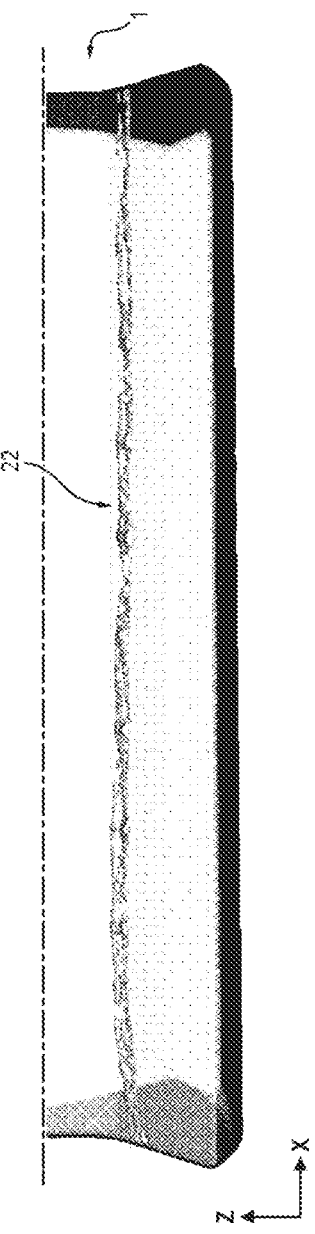
FIG. 2a PRIOR ART
FIG. 2b PRIOR ART

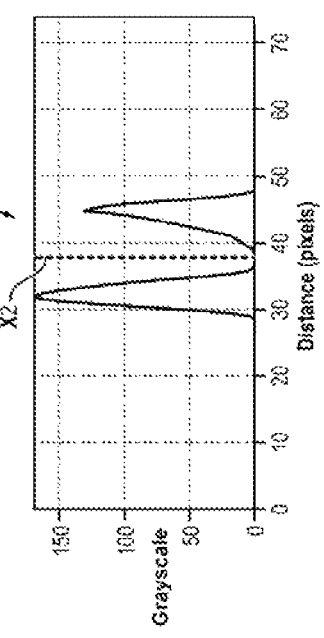
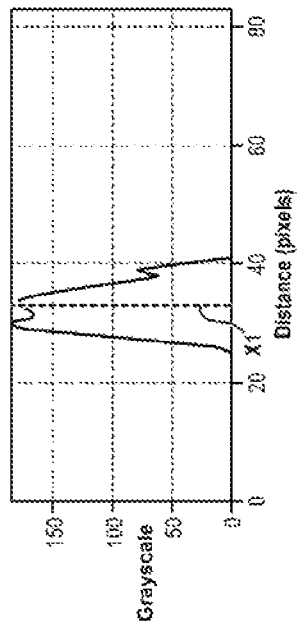

BLADE

This application is a National Stage of International Application No. PCT/FR2021/050766 filed May 4, 2021, which is based on and claims priority to French Application No. 2004386 filed May 4, 2020.

GENERAL TECHNICAL FIELD

The invention relates to the general field of turbomachine blades made of composite material and relates to a manufacturing control method for such a blade implementing a preform and a mold.

STATE OF THE ART

Composite materials allow making turbomachine blades, particularly for the fan of the turbomachine.

As illustrated in FIG. 1, a blade conventionally comprises a body 1 made of composite material made from a preform. This preform comprises a weaving of a plurality of weaving yarns or fibers, which include warp yarns and weft yarns. The weaving can be in a single piece obtained by three-dimensional weaving and can in particular comprise glass, aramid and/or ceramic carbon fibers.

The composite material body comprises a root 11, a stilt 12 and an airfoil 13 having an aerodynamic profile. A blade reference frame X, Y, Z is defined below: the axis X corresponds to the longitudinal direction of the blade root, the axis Z corresponds to the longitudinal direction along which the airfoil 13 extends from the root 11, the axis Y corresponds to the thickness of the blade. Of course, the axes X, Y and Z are orthogonal two by two, the blade reference frame being orthonormal.

The preform is cut according to the shape and dimensions of the portions constituting the blade and placed in a mold.

A binder comprising a thermosetting resin is then injected into the mold, in order to impregnate the entire preform. After heating the mold, the molded part is taken out of the mold. The molding is for example a vacuum resin injection process of the RTM (Resin Transfer Molding) or even VARRTM (Vacuum Resin Transfer Molding) type.

During the manufacture of the blade, a thick preform is therefore deposited in the cavity of an injection mold. The 3D woven preforms are thick one-piece fabrics. In the case of a turbomachine fan blade, the one-piece preform is of variable thickness in order to be adapted to the aerodynamic profile of the blade (see FIG. 1).

Thus, when this variable-thickness preform is deposited in a variable-thickness injection mold, it is important to ensure that it is correctly positioned, in order to obtain a part of homogeneous material integrity. Indeed, if the thick area of the preform is badly positioned and is in a thin area of the mold, the fiber volume rate of the part will be greatly affected and potentially non-compliant.

Thus, in the two groups of yarns provided for the preform, there are provided structural yarns ensuring the structure of the preform, and tracer yarns visually identifiable from the other ones and disposed evenly at least on the surface of the preform. These few glass yarns positioned on the surface are called glass tracers or tracers in what will be described below. These, which represent a visible grid, allow spatially locating the preform, and therefore assessing its correct positioning.

To check the integrity of the blade after injection, the positioning of the preform in the blade obtained after injection is controlled. The control consists in the reference frame of the blade, in measuring the height in Z along the axis X of the center of the glass tracer, called the neutral fiber.

To do so, an X-ray tomography of the blade is implemented to ensure its integrity and to check the location of the neutral fiber relative to their theoretical position.

Particularly, thanks to the tomography, it is possible to reconstruct the neutral fiber in the tomographic volume and to check its correct positioning. However, such a method only allows capturing scraps of glass tracers and not all of it and therefore capturing scraps of the neutral fiber.

FIGS. 2a and 2b respectively illustrate a tracer 21 partially detected in a blade 1 by X-ray tomography and 3D reconstruction and a theoretical tracer 22.

When there are inaccuracies in the detection of the neutral fiber, the checking of the correct positioning of the perform, and therefore of the integrity of the part, is inaccurate.

PRESENTATION OF THE INVENTION

The invention allows overcoming the aforementioned drawbacks.

To this end, the invention proposes, according to a first aspect, a method for checking the positioning of a fibrous preform in a blade, the blade having been obtained by injection of a resin into a mold having the shape of a blade. and in which a preform has been placed, the blade extending in an orthonormal blade reference frame X, Y, Z, the blade comprising a blade root extending longitudinally along an axis X, an airfoil extending from the blade root along an axis Z, the blade having a thickness defined along an axis Y, the preform comprising glass tracers positioned on the surface of the preform, the center of the tracers defining a neutral fiber located at a height along the axis Z along the direction defined by the axis X, the method comprising the following steps:

acquiring 2D tomographic projections of the blade by means of an imaging system comprising an X-ray source, each projection being acquired at a given orientation of the X-ray source relative to the blade;

accumulating the 2D projections along the direction of the axis Y so as to obtain a 2D image accumulated along the directions X and Z;

determining, for each pixel column defined along the direction of the axis Z, a profile of grayscales;

processing each of the profiles obtained so as to locate the position in Z of the neutral fiber along the direction of the axis X.

The invention, according to the first aspect, is advantageously completed by the following characteristics, taken alone or in any one of their technically possible combinations:

the projection consists in obtaining a 2D image made up of pixels having the maximum grayscale among a stack of pixels of the different sections stacked along the direction of the axis Y;

the projection consists in that the 2D image is made up of pixels whose grayscale is the sum of the pixels of the different sections stacked along the direction of the axis Y;

the profile of grayscales is a Gaussian, the location of the neutral fiber being the center of the Gaussian;

the profile of grayscales is a double Gaussian, the location of the neutral fiber being the center of the two Gaussians;

the method comprises a step of filtering the location along the direction Z of the neutral fiber along the direction of the axis X;

the method comprises a step of comparing the location of the thus obtained neutral fiber with a theoretical location of the neutral fiber.

The invention proposes, according to a second aspect, a method for manufacturing a turbomachine blade made of composite material, the method comprising the following steps:

placing a fibrous preform in a mold having the shape of a blade;

injecting under vacuum a resin into the mold comprising the preform so as to obtain the blade called injected blade;

checking the positioning of the fibrous preform in the injected blade by means of a method according to the invention.

The invention proposes, according to a third aspect, a blade of a turbomachine fan obtained by a method according to the second aspect of the invention.

The invention proposes, according to a fourth aspect, an aircraft comprising a fan blade according to the third aspect of the invention.

The advantages of the invention are multiple from a time accuracy, repeatability, reproducibility and control time point of view.

The accuracy of the detection is improved compared to the known techniques, particularly, from a precision, repeatability, reproducibility and control time point of view.

The processing operations implemented are fast and require few resources because there is no longer a need for a dimension, unlike the usual tomography which implements a 3D reconstruction.

The measurement of the positioning of the neutral fiber is thus obtained with high accuracy.

PRESENTATION OF THE FIGURES

Other characteristics, aims and advantages of the invention will emerge from the following description which is purely illustrative and not limiting and which should be read in relation to the appended drawings in which, in addition to FIGS. 1, 2a and 2b already discussed:

Figure 5:
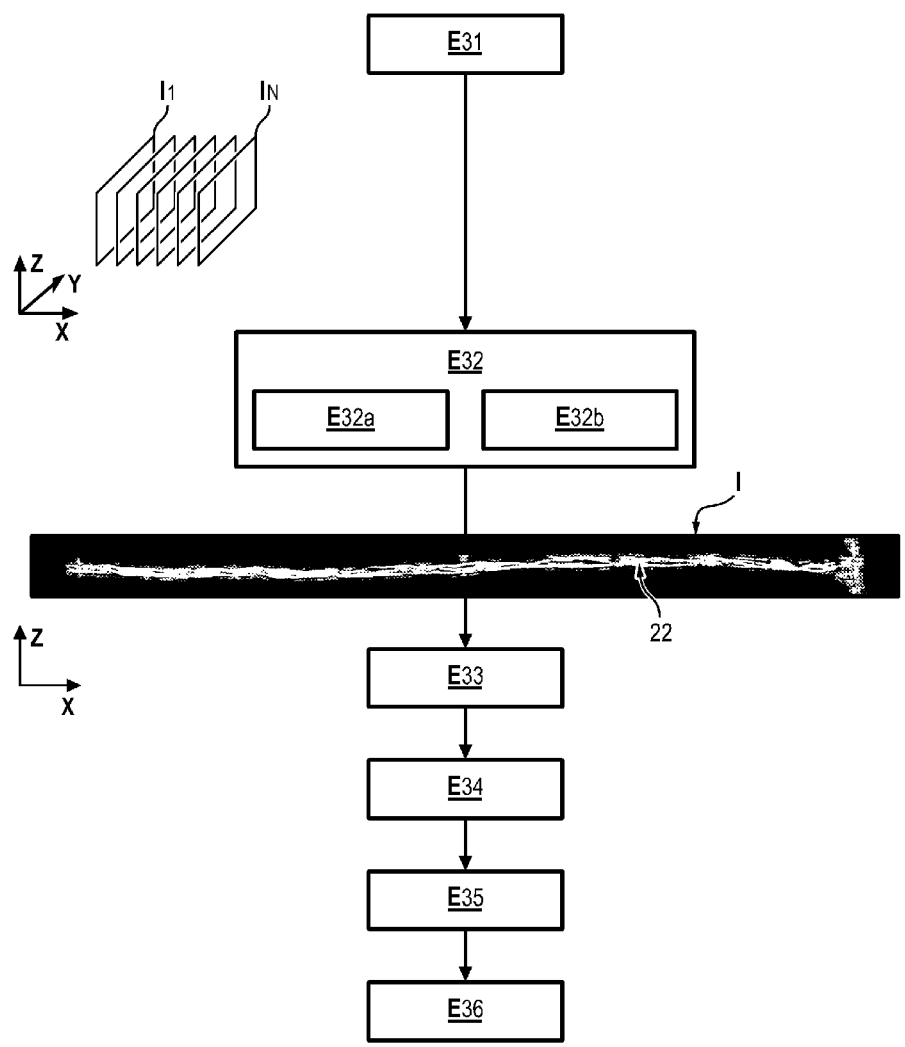
FIG. 5 illustrates steps of a method for checking the positioning of a preform in a blade according to the invention.
Figure 6:
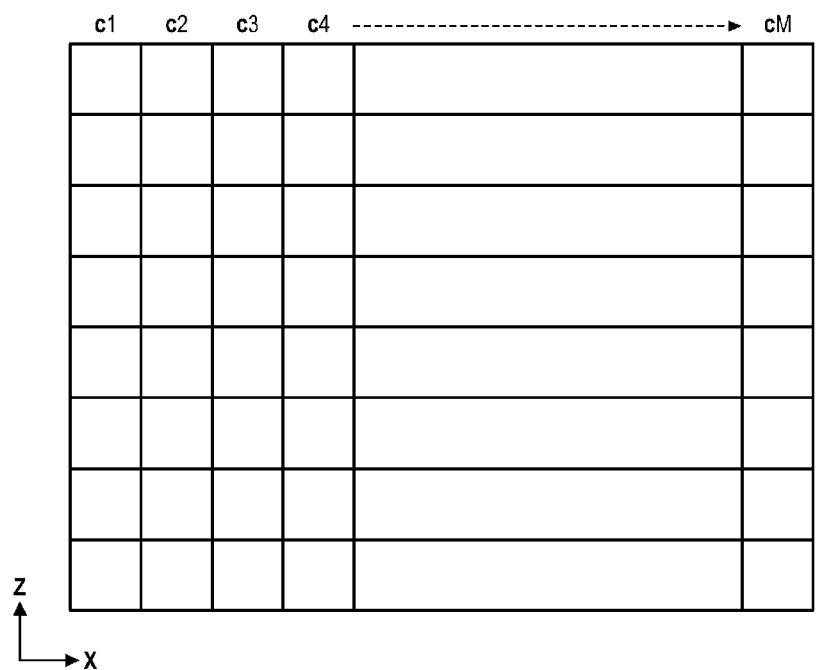

FIG. 6 schematically illustrates pixels of an image;

FIGS. 7 and 8 illustrate grayscale profiles obtained by means of a method according to the invention;

FIG. 9 illustrates a 2D image obtained by means of the method of FIG. 5.

In all the figures, similar elements bear identical references.

DETAILED DESCRIPTION

General Presentation of the Method

Figure 1:
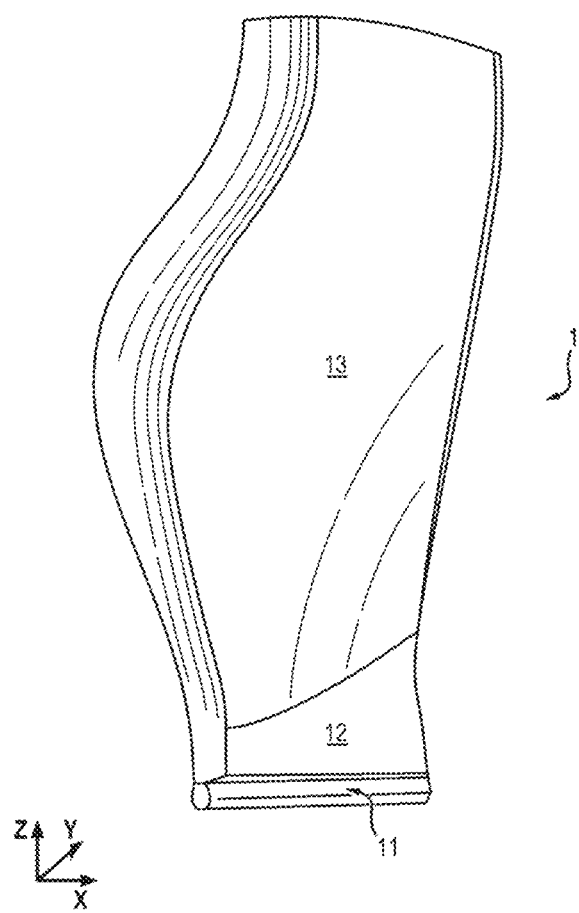
Figure 3:
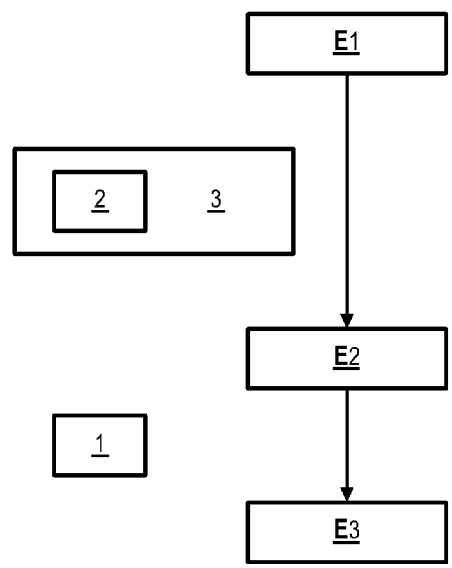
FIG. 3 illustrates steps of a method for manufacturing a turbomachine blade according to the invention.

In relation to FIG. 3, a method for manufacturing a turbomachine blade made of composite material comprises the following general steps. These steps can be implemented in different ways known to those skilled in the art and will not be detailed below but only presented in a general manner (see also the introduction to the present application).

A fibrous preform 2 is placed in a mold 3 having the shape of a blade (step E1) and a resin is injected (step E2) under vacuum into the mold comprising the preform so as to obtain the blade.

Then, the method comprises a step of checking (step E3) the blade implementing in particular an imaging system that allows obtaining 2D projections or 2D images. It is from a processing of these 2D projections that the checking is performed.

Tomography Imaging System

Figure 4:
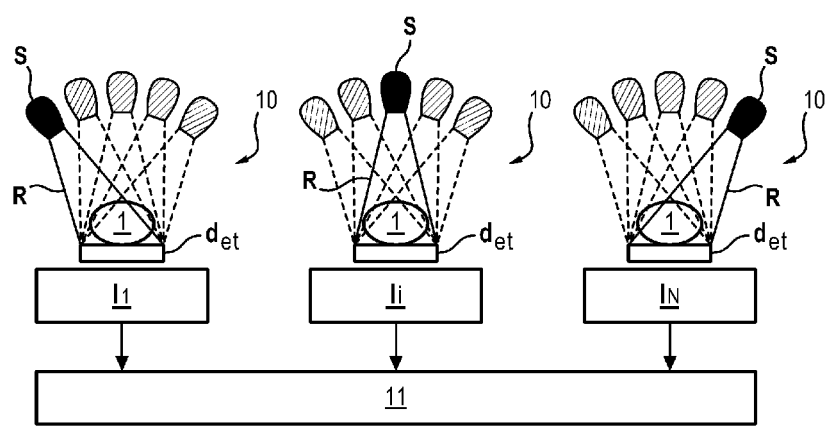
FIG. 4 illustrates an imaging system according to the invention.

FIG. 4 illustrates an imaging system 10 that allows acquiring 2D projections of a blade 1. X, R rays coming from a source S are emitted at different angulations $(1, \ldots, i, \ldots, n)$ towards the blade 1. After having passed through the blade 1, they are detected by a detector $D_{et}$ forming a set of 2D projections $I_1, \ldots, I_i, \ldots, I_N$. It should be noted that there are as many 2D projections acquired as there are considered angulations. The set of the angulations covers a semi-circle around the blade 1. The acquisition is therefore implemented by the detector $D_{et}$ above which the blade 1 is placed. This is for example a digital camera.

The 2D projections are then processed by a processing unit connected to or forming part of the imaging system. The processing unit is for example a processor. In the case where the processing unit is remote from the imaging system, it is connected in a wired or wireless manner to the imaging system. The processing unit allows implementing image processing methods 2D obtained.

Checking of the Positioning of a Fibrous Preform in a Blade

The checking of the positioning of a fibrous preform in the blade 1 is implemented by the processing unit of the imaging system 10 described above. Particularly, this checking comprises the steps described below, in relation to FIG. 5.

Several 2D tomographic projections of the blade 1 by means of the imaging system 10 are acquired (step E31). Each projection corresponds to a given orientation of the X-ray source relative to the blade. Then there are N 2D images $I_1, \ldots, I_N$. Each projection is made up of several grayscale pixels.

These 2D images are then accumulated (step E32) along the axis Y so as to obtain an accumulated 2D image denoted I along the directions of the axes X and Z. In each image each pixel has a grayscale value. Each pixel P to $P_m$ of the accumulated image I is obtained by the average of the grayscales of the corresponding pixels, along the axis Y. These accumulated pixels have the same coordinates in X and Z. By this accumulation, there is no longer a need for a dimension, here the Y dimension. Indeed, to assess the positioning of the preform, only two coordinates are sufficient, the position information along the direction of the axis Y (in the thickness of the blade 1) proves to be of little importance to assess the integrity of the blade 1.

This accumulation amounts to accumulating voxel information along a direction.

According to one embodiment, the accumulation (step E32a) consists in that the accumulated 2D image obtained is made up of pixels having the maximum grayscale among the stack of pixels of the different sections stacked along the direction of the axis Y. According to this embodiment, the consideration of the glass fiber only (material used for the neutral fiber) is maximized, but some portions can however be omitted if the signal is too weak.

According to one embodiment, the accumulation (step E32b) consists in that the accumulated 2D image obtained is made up of pixels whose grayscale is the sum of the pixels of the different 2D projections stacked along the direction of the axis Y. According to this embodiment, the amount of information taken into account is maximized, but parasitic signal can be detected.

Then, for each pixel column defined along the axis Z, a profile of grayscales is determined (step E33). The scale is advantageously an unsigned 16-bit scale so that there are 65536 grayscales from black at 0 to white (65535). Thus, there are as many profiles as there are columns along the direction of the axis Z.

FIG. 6 schematically illustrates an image comprising pixels (one square is one pixel). A profile consists for each column c1, c2, c3, c4, . . . , cM in a variation of the grayscale.

FIGS. 7 and 8 show two profiles depending on whether the glass tracer comprises one wire (FIG. 7) or two wires (FIG. 8). The profile comprises a grayscale on the ordinate and a distance on the abscissa. The profile in FIG. 7 is a simple but broad Gaussian and the profile in FIG. 8 is a double Gaussian composed of two narrow Gaussians. These two signature possibilities are characteristic of the fiberglass and are the only two scenarios that can be encountered. Indeed, the glass fiber being a set of twisted glass and carbon strands, it appears in X-ray tomography as two white lines when the glass strands are distributed on either side of the neutral fiber, or as a single but thick white line when the strands intersect at the neutral fiber.

Then each of these profiles is processed (step E34) to locate the neutral fiber. Indeed, by referring to the image I of FIG. 5, it is understood that the grayscale of each column allows obtaining the height along the axis Z at which the neutral fiber is located.

Particularly, the processing consists, in the case of a profile of the type of the one illustrated in FIG. 7, in detecting the center of the Gaussian and in the case of a profile of the one illustrated in FIG. 8, in detecting the center of the two Gaussians. The detected values are illustrated by the thick dotted curve.

Therefore, at the end of the processing step (step E34), the height at which the neutral fiber 22 is located is obtained along the axis X.

In a complementary manner, the set of heights thus obtained can be filtered (step E35) to smooth the different values and thus filter the aberrant values. Advantageously, a regression filtering can be implemented. FIG. 9 illustrates a cumulative 2D image of the neutral fiber after filtering. In comparison with the image I of FIG. 5, it is observed that the curve representing the neutral fiber is less noisy.

Filtered or not, the image I (FIG. 5) or the image If (FIG. 9) are each a 2D view of the neutral fiber of better quality than the one obtained with the methods of the prior art (see FIG. 2a).

Finally, a comparison at nominal dimensions and pre-defined tolerances (step E36) of the location of the thus obtained neutral fiber with a theoretical location of the neutral fiber is implemented to allow assessing the integrity of the blade 1.

The invention claimed is:

1. A method for checking the positioning of a fibrous preform in a blade, the method comprising:
  acquiring two-dimensional (2D) tomographic projections of a blade by an imaging system comprising an X-ray source, each projection being acquired at a given orientation of the X-ray source relative to the blade, the blade having been obtained by injection of a resin into a mold having the shape of a blade and in which a preform has been placed, the blade extending in an orthonormal blade reference frame X, Y, Z, the blade comprising a blade root extending longitudinally along an axis X, an airfoil extending from the blade root along an axis Z, the blade having a thickness defined along an axis Y, the preform comprising glass tracers positioned on the surface of the preform, the center of the tracers defining a neutral fiber located at a height along the axis Z along the direction defined by the axis X;
  accumulating the 2D projections along the direction of the axis Y so as to obtain a 2D image accumulated along the directions X and Z;
  determining, for each pixel column defined along the direction of the axis Z, a profile of grayscales;
  processing each of the profiles obtained so as to locate the position in Z of the neutral fiber along the direction of the axis X.

2. The method according to claim 1, wherein the accumulating comprises obtaining an accumulated 2D image made up of pixels having the maximum grayscale among a stack of pixels of the different sections stacked along the direction of the axis Y.

3. The method according to claim 1, wherein in the accumulating the 2D projections, the accumulated 2D image is made up of pixels whose grayscale is the sum of the pixels of the different sections stacked along the direction of the axis Y.

4. The method according to claim 1, wherein the profile of grayscales is a Gaussian, the location of the neutral fiber being the center (X1) of the Gaussian.

5. The method according to claim 1, wherein the profile of grayscales is a double Gaussian, the location of the neutral fiber being the center of the two Gaussians.

6. The method according to claim 1, comprising filtering the location along the direction Z of the neutral fiber along the direction of the axis X.

7. The method according to claim 1, comprising comparing the location of the thus obtained neutral fiber with a theoretical location of the neutral fiber.

8. The method for manufacturing a turbomachine blade made of composite material, the method comprising:
  placing a fibrous preform in a mold having the shape of a blade;
  injecting under vacuum a resin into the mold comprising the preform so as to obtain a blade called an injected blade;
  checking the positioning of the fibrous preform in the injected blade by the method according to claim 1.

\* \* \* \* \*